US012567750B1

(12) United States Patent
     Perez

(10) Patent No.: US 12,567,750 B1
(45) Date of Patent: Mar. 3, 2026

(54) HIGH EFFICIENCY POWER TRANSDUCER

(71) Applicant: NaDaQua Industry Inc, Miami, FL (US)

(72) Inventor: Pedro Chi Perez, Miami, FL (US)

(73) Assignee: NADAQUA INDUSTRY INC, Miami, FL (US)

( * ) Notice: Subject to any disclaimer, the term of this patent is extended or adjusted under 35 U.S.C. 154(b) by 776 days.

(21) Appl. No.: 17/990,127

(22) Filed: Nov. 18, 2022

Related U.S. Application Data

(60) Provisional application No. 63/283,023, filed on Nov. 24, 2021.

(51) Int. Cl.
     H02J 7/30        (2006.01)
     H02J 7/14        (2006.01)
     H02J 7/18        (2006.01)

(52) U.S. Cl.
     CPC .............. H02J 7/30 (2013.01); H02J 7/1438 (2013.01); H02J 7/18 (2013.01); *H02J 2207/20* (2020.01)

(58) Field of Classification Search
     CPC ....................................................... H02J 7/30
     USPC ......................................................... 320/137
     See application file for complete search history.

(56)                References Cited

U.S. PATENT DOCUMENTS

| | | | |
|---|---|---|---|
| 7,567,004 B2 | 7/2009 | Smith | |
| 7,782,015 B1 | 8/2010 | Aaron | |
| 8,994,215 B1 * | 3/2015 | Davis | H02J 9/00 |
| | | | 307/64 |
| 9,941,710 B2 | 4/2018 | Clay et al. | |
| 10,581,252 B2 * | 3/2020 | Clay | H02J 7/0013 |
| 2003/0102752 A1 | 6/2003 | Mathisen | |
| 2011/0049892 A1 | 3/2011 | Ross | |
| 2011/0050018 A1 * | 3/2011 | Rogers | H02K 53/00 |
| | | | 310/113 |
| 2011/0234036 A1 | 9/2011 | Torres | |
| 2011/0291621 A1 | 12/2011 | Iles et al. | |
| 2012/0161564 A1 | 6/2012 | Lee et al. | |
| 2012/0286572 A1 | 11/2012 | Tracy | |

\* cited by examiner

*Primary Examiner* — Yalkew Fantu
(74) *Attorney, Agent, or Firm* — MALLOY & MALLOY, PL

(57)                ABSTRACT

The present invention relates to a power transducer system configured to operate at a high level of efficiency. Such a power transducer system may comprise various components, all of which may be scalable dependent upon the needs of electrical power to be supplied to a downstream load. In at least one embodiment, such a power transducer system may comprise at least one power cell interconnected with an inverter component. Such an inverter component May be electrically connected with a motor component through a switch component, wherein such motor component may be configured to generate mechanical energy. Such mechanical energy May be subsequently imparted onto a generator component for the generation of electrical energy, such as through an armature component. Such electrical energy may be provided to downstream loads therefrom, with any residual energy generated being recycled back through the system via the switch component.

18 Claims, 3 Drawing Sheets

200

HIGH EFFICIENCY POWER TRANSDUCER

CLAIM OF PRIORITY

The present Non-Provisional patent application is based on, and a claim of priority is made under 35 U.S.C. Section 119(e) to a provisional patent application that is currently pending in the U.S. Patent and Trademark Office, namely, that having Ser. No. 63/283,023 and a filing date of Nov. 24, 2021, which is incorporated herein by reference in its entirety.

FIELD OF THE INVENTION

The present invention is directed to a power transducer system configured to operate at a high level of efficiency by generating electrical energy to be provided to downstream loads, with any residual energy created by the system recycled back through the system, thereby reducing reliance on the power cell initiating the system.

DESCRIPTION OF THE RELATED ART

In traditional systems configured for power generation and/or power provision, such as power supply circuits, the creation of energy and the efficient transfer of such created energy is paramount. Indeed, absent an energy source, power-generating devices such as generators and batteries are wholly ineffective. As such, traditional power systems all rely on an energy source to function. Such an energy source may comprise, without limitation, gasoline, diesel, propane, coal, natural gas, solar energy, nuclear energy, and wind-based energy.

Yet, all such types of energy sources necessarily carry certain limitations impacting their efficacy in a power supply circuit. For instances, primary energy sources—e.g., oil, coal, and natural gas—are limited in availability. This limited availability necessarily leads to rising costs as such primary energy sources are consumed. Such rising costs is only exacerbated by the necessity of discovery and extraction of such primary energy sources. And, it should be noted, such primary energy sources are problematic for the public welfare at large, due to the impact such primary energy sources may have on the environment of our planet.

Given the use of renewable energy sources, such as solar and wind, remain relatively new, at least in terms of large-scale power generation, such renewable energy sources currently suffer from issues relating to efficiency and reliability. Indeed, the stochastic nature of such renewable energy sources means the availability of such renewable energy sources is randomly determined and cannot be reliably predicted, thereby resulting in imbalances between power generation and power demand. Whether such issues are ultimately resolved remains to be seen. Nonetheless, as with primary energy sources, renewable energy sources likewise require harvesting, which necessarily requires specialized equipment and maintenance therefor, thereby requiring yet additional expenses impacting efficiency and reliability of power supply circuits using renewable energy as its energy source. Thus, while perhaps an idyllic solution to the climate change issues plaguing our planet, there remain issues with renewable energy sources indicative of risk.

Nuclear energy, on the other hand, also suffers from certain issues and limitations. Indeed, although the generation of nuclear energy is carbon-free, reliable, and relatively safe, the generation of nuclear energy necessitates specialized thermal power stations configured to harness thermal energy released from nuclear fission. Moreover, the generation of nuclear energy still requires the mining of uranium, which may be costly and time-consuming, as well as posing certain occupational health risks stemming from high levels of exposure to radon, the product of the radioactive decay of uranium. And, of course, while nuclear energy offers many benefits, issues relating to the disposal of nuclear waste, as well as the possibility of devastating radioactive contamination in areas surrounding a thermal power station in the event of an accident, renders nuclear energy a divisive energy source.

As such, it may be seen each energy source necessarily carries certain limitations rendering it a less than ideal solution to the world's energy problems. Whether such issues pertain to limited availability, environmental impact, efficiency and reliability, costliness, or perceived safety issues, it is clear a solution is required.

Ideally, instead of focusing on the ideal method of generating energy, such a solution should instead focus on the cycling of energy throughout a power system at high efficiency. In so doing, issues such as limited availability, environment impact, costliness, and perceived safety issues may all be reduced, or even completely vitiated.

Preferably, such a solution should be configured to continuously recycle energy throughout a given energy circuit, while outputting power to external downstream loads. Such a solution should be configured for the highest possible efficiency, such that excess energy is not consumed or otherwise lost to external factors. Such a solution should further be configured to operate according to a variety of different specifications, such that the solution may be scaled to power a variety of different external devices and/or systems. Even further, at least one embodiment of such a solution should be configured to reduce, or otherwise remove the necessity for moving parts, thereby reducing instances of mechanical failure, and thus increasing reliability.

SUMMARY OF THE INVENTION

Alternative embodiments of the present invention are each directed to systems and methods configured to provide a power transducer system configured to operate at a high level of efficiency, such that energy originally used to initiate such system may be continuously recycled with only minimal losses thereof. In so doing, the various embodiments of the present invention may be configured so as to continuously recharge itself, and thereby run on itself, so to speak. Accordingly, the system of at least one embodiment disclosed herein may reduce or otherwise vitiate the need for the continual provision of energy from external energy sources, whether comprising primary energy sources, renewable energy sources, nuclear energy sources, or otherwise.

As may be understood, the various embodiments disclosed or otherwise inherently contemplated herein may be accordingly scaled dependent upon the type of application thereof. For instance, at least one embodiment of the present invention may be appropriately scaled for use in connection with a central air conditioning unit of a house, apartment, dwelling, or abode. In contrast, at least one alternative embodiment of the present invention may instead be appropriately scaled for use in connection with an electric car or motor vehicle. Moreover, at least one alternative embodiment of the present invention may be configured use in connection with a stand-alone generator. In other words, various embodiments of the present invention may be scaled for various systems of various power needs, and thus should not be limited in any fashion relating thereto.

More specifically, various embodiments of the present invention may comprise a system and method configured to continuously power at least one downstream load after an initial consumption of energy while continuously restoring an amount of energy to at least one power cell. In so doing, any downstream load electrically connected to the system of various embodiments of the present invention may be continuously powered without requiring any implementation of further external energy to the system disclosed herein.

For instance, various embodiments of the present invention may comprise a plurality of components configured in electrical communication with one another. Generally speaking, various embodiments of the present invention may comprise at least one power cell serially configured in electrical communication with an inverter component and a generator-armature component (hereinafter referred to as the "generator component"), wherein such generator component comprises at least one downstream load outlet. Such at least one downstream load outlet may be configured for the provision of electrical energy to at least one downstream load—i.e., any external device needing electrical energy supplied thereto.

As previously stated, such a downstream load may comprise a plurality of different systems and components and may depend on the intended implementation of the system described herein, such as an air conditioning unit, an electrical vehicle, or any other appliance, apparatus, and/or system configured for electrical energy consumption. As may be understood, such at least one downstream load outlet may be configured for use in connection with any plug and/or socket type now known or hereafter developed. For instance, such a downstream load outlet may be configured for connection with any socket type, such as Type A-Type O and all types in between and may be configured to provide electrical energy at various currents and voltages. Accordingly, it may be understood that alternative embodiments of the system described herein may be configured for use with the electrical demands of the various countries around the globe.

In at least one embodiment of the present invention, such a power cell may comprise some component configured for the storage of electricity. For instance, such a power cell may comprise a battery, such as a secondary battery configured to be recharged via the reversal of the chemical reactions occurring therein via the application of an electrical current thereto. Various embodiments of such a power cell may comprise a variety of chemical compositions. For instance, such a power cell may comprise a lead-acid battery, a nickel-cadmium battery, a nickel-metal hydride battery, or a lithium-ion battery. However, it may be understood such a power cell May ultimately comprise any rechargeable energy source, whether now known or hereafter developed.

In at least one embodiment of the present invention, such a power cell may initially begin with an amount of electrical energy stored therein. In other words, such a power cell may comprise some amount of initial energy, such as an amount sufficient to allow the activation of the system disclosed herein.

As may be understood, the particular type of power cell, and the amount of electrical energy initially stored therein, and/or the number of power cells to be used within a system may depend upon the intended application of such system. For example, it may be understood an embodiment of the present invention to be used in connection with an air conditioning system for a house May require different energy needs than one to be used in connection with an electrical vehicle, or even one to be used simply in connection with a small appliance. Hence, alternative embodiments of the present invention may comprise differing capacities, wide voltage ranges, and differing shapes and sizes.

As previously stated, the power cell of at least one embodiment of the present invention may be configured in electrical communication with an inverter component. Such an inverter component may comprise a component configured to change the current provided by such power cell from a direct current to an alternating current. In at least one embodiment, such an inverter component may be configured in connection with a motor component, or some other mechanical means configured for rotational and/or longitudinal movement, wherein such movement is configured to provide mechanical energy to any further components connected thereto. Accordingly, it may be understood such an inverter may be configured to convert the electrical energy supplied thereto in order to subsequently turn a motor component in order to provide mechanical energy to components connected thereto.

In at least one embodiment of the present invention, the electrical communication between such power cell(s) and such inverter may be configured through a switch component, which May be configured so as to make, or break, the aforementioned electrical connection. Such a switch component may comprise, for instance, a single pole single throw switch, or any other like component configured to form the electrical circuit of the system described herein. As may be understood, such a switch component may be communicatively configured in connection with a switch activator, which may be configured to alternatively dispose such a switch component in either an "On" or "Off" position.

Configured in mechanical communication with such inverter through the motor component may be a generator component through a rotational assembly. Such a generator component May be configured to generate electricity via the mechanical movement supplied by the motor component. For instance, in at least one embodiment of the present invention, such an motor component and such generator component may be mechanically interconnected via a rotational assembly, wherein such rotational assembly may comprise a male rotational component configured in mechanical communication with a female rotational component. As may be understood, such male rotational component may be attached to such motor component, whereas such female rotational component may be attached to such generator component, or vice versa. As such, it may be understood rotational movement supplied by such motor component may thus be imparted onto such generator component through such rotational assembly.

In view thereof, such generator component may be configured to generate electricity stemming from such rotational movement supplied thereto through such rotational assembly. In so doing, at least one of such male rotational component and/or such female rotational component may be disposed in connection with an armature component, which may be configured to produce power from the mechanical energy imparted from the inverter thereon.

For instance, in at least one embodiment, such a generator component may comprise an armature component. Such armature component may be configured as a conductor to both carry current and generate electromotive force. As a result, electrical power is generated therefrom.

Such a generator component may further comprise at least one downstream load output, through which at least one downstream device and/or system may be attached. As previously stated, such a downstream load output may itself comprise one or more socket types, such as Type A-Type O and all types in between, and thus may be configured to provide electrical energy at various currents and voltages. Accordingly, it may be understood that the downstream load output may be configured for use with the electrical demands of the various countries around the globe.

Disposed in serial connection with such generator component may be the switch component recited heretofore. More specifically, the main component of such switch component may be configured in electrical communication with the generator component, such that any residual energy not transferred to at least one downstream load is provided to the switch component. Because such switch component is electrically configured in communication with the inverter, it may be understood such residual energy may therefore be recycled through the system, such that the system may thus continually run on the initial energy provided by the energy source, whilst providing electrical energy to downstream loads.

Notwithstanding, as may be understood, alternative embodiments of the present invention may instead utilize different components and/or structures to achieve a similar system. For instance, the inverter component may be substituted for a converter component, whereas the generator component and/or motor component may likewise be substituted for both an inverter component and a converter component. And, as previously discussed herein, various embodiments of the present invention may be configured to provide electrical energy at varying voltages and electrical currents. Such embodiments will be discussed in greater detail hereafter.

These and other objects, features, and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE INVENTION IN VARIOUS EMBODIMENTS

As discussed heretofore, alternative embodiments of the present invention are directed to systems and methods configured to provide a power transducer system configured to operate at a high level of efficiency, such that energy used to initiate such system is continually recycled, such that only minimal losses thereof are experienced. As may be understood, at least one of such alternative embodiments may be configured as part of an open system, wherein energy by transferred between the inventive system described herein and its surroundings. While various embodiments of the present invention are described herein, including certain specifics therefor, it should be understood and appreciated the systems described herein may be appropriately scaled dependent upon their intended use. For instance, the various embodiments described herein May be utilized in connection in both small and large contexts, such as the standalone generator, a battery for an electric vehicle, or the central air conditioning unit of a house, dwelling, or apartment. As such, it may be understood the various embodiments described herein are non-limiting, but are instead merely exemplary of the inventive system described herein.

Figure 1:
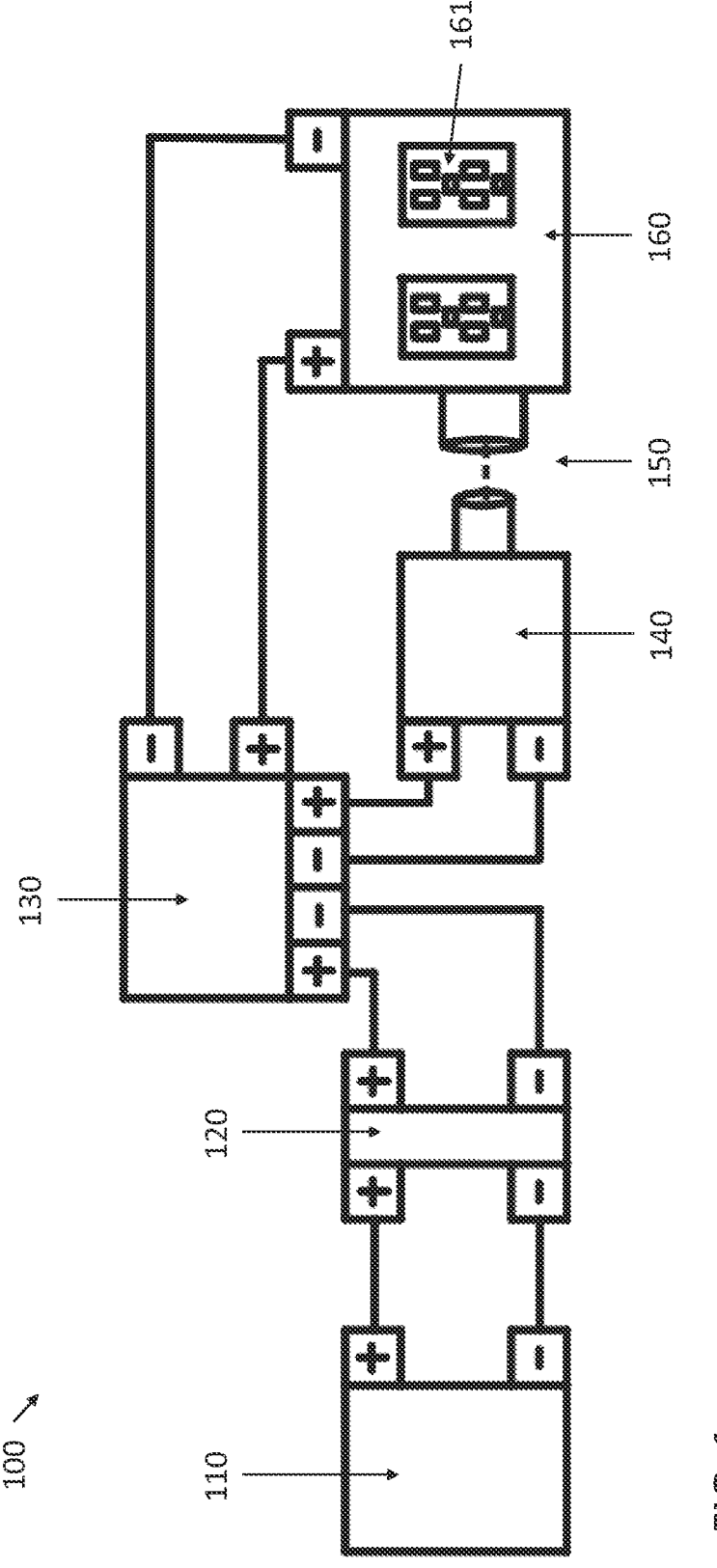
FIG. 1 depicts a block diagram of a power transducer in accordance with at least one embodiment of the present invention.

With reference to FIG. 1, depicted therein is one embodiment of a power transducer system 100 configured to operate at a high level of efficiency. There, it may be seen such power transducer system may comprise at least one power cell 110, which may be configured for the storage of at least some electricity therein—i.e., some amount of initial energy. Such a power cell 110 may comprise, for instance, a battery, an electrochemical cell, a fuel cell, or even a solar cell. For instance, such a power cell 110 may comprise a secondary battery, configured to be recharged via the reversal of the chemical reactions occurring therein. Such a power cell 110, if the same comprises a battery, may likewise comprise various chemical compositions, whether lead-acid, nickel-cadmium, nickel-metal hydride, lithium-ion, or otherwise. In at least one embodiment of the present invention, such as the one depicted in FIG. 1, such a power cell 110 may comprise one 12 volt battery, or even a plurality thereof.

In the embodiment depicted in FIG. 1, such power cell 110 may be configured to transfer at least a portion of such initial energy to an inverter component 120, which is configured in electrical communication therewith. Such inverter component 120 may be configured to change the current provided by such power cell 110 from a direct current to an alternating component. Likewise, such inverter component 120 may be configured to alter the voltage provided thereto by the power cell 110. For instance, in the embodiment depicted in FIG. 1, such inverter may be configured to change the 12 volt DC current provided by the power cell 110 into a 110 volt AC current.

Interconnected with such inverter 120 may be a switch component 130. Such a switch component 130 may itself comprise a switch activator, such as an on/off switch, such that the power transducer system 100 may be switch on or off. Such switch component 130 may thus comprise, for instance, a single pole single throw switch, or any other like component configured to form the electrical circuit of the system described herein.

Configured in electrical communication with such inverter component 120 through such switch component 130 may be a motor component 140. Such a motor component 140 may comprise a movement apparatus configured for rotational and/or longitudinal movement, wherein such movement may be initiated upon the provision of the 120 volt AC current provided to the motor component 140. As such, when the switch activator is in the "on" position, the motor component 140 may thus turn to provide mechanical energy to any component interconnected therewith.

For instance, in the embodiment depicted in FIG. 1, such motor component 140 may be interconnected with a generator component 160 through a rotational assembly 150. Such a rotational assembly 150 may comprise, for instance, a male-female connection between a male rotational component and a female rotational component, either of which may be interconnected with the motor component 140 and/or generator component 160. Accordingly, through the rotational assembly 150, the rotational and/or longitudinal movement created by the motor component 140 may thus be imparted on the generator component 160.

Such a generator component 160 may be configured to generate electricity from such rotational movement imparted thereon by the rotational assembly 150. For instance, in at least one embodiment of the present invention, such a generator component 160 may comprise an armature component, configured to both carry current and generate electromotive force. As a result, such armature component may be configured to generate electrical power from such motor component 140.

Such a generator component 160 may further comprise at least one downstream load output 161. Such a downstream load output may comprise, for instance, a socket, such as Type A-Type 0 or any other socket type in between. Accordingly, such a downstream load output 161 may be configured for the interconnection with a plug of any type, such that the generator component 160 may be configured to provide electrical energy to any apparatus connected thereto, interdependent on the location thereof. In other words, such downstream load output 161 may be configured for use in various countries around the globe. As such, the generator component 160 and/or any other component recited herein configured to provide electrical energy to a downstream load may be configured to provide electrical output at 110 volt, 220 volt, or any other voltage.

As may be understood, such generator component 160 may, in at least one embodiment, generate residual energy not output to downstream loads through the downstream load output 161. In such instance, such residual energy is subsequently routed to the switch component 130, such as through the main side thereof. As such, the switch component 160 may thus reroute such residual energy back to the motor component 140, wherein the cycle of the power transducer system 100 recited herein thus restarts. Likewise, such residual energy may also be transferred back to the power cell 110, thereby recharging the same. As such, it may be understood the power transducer system 100 of at least one embodiment herein may run of the initial power provided by the power cell 110.

Figure 2:
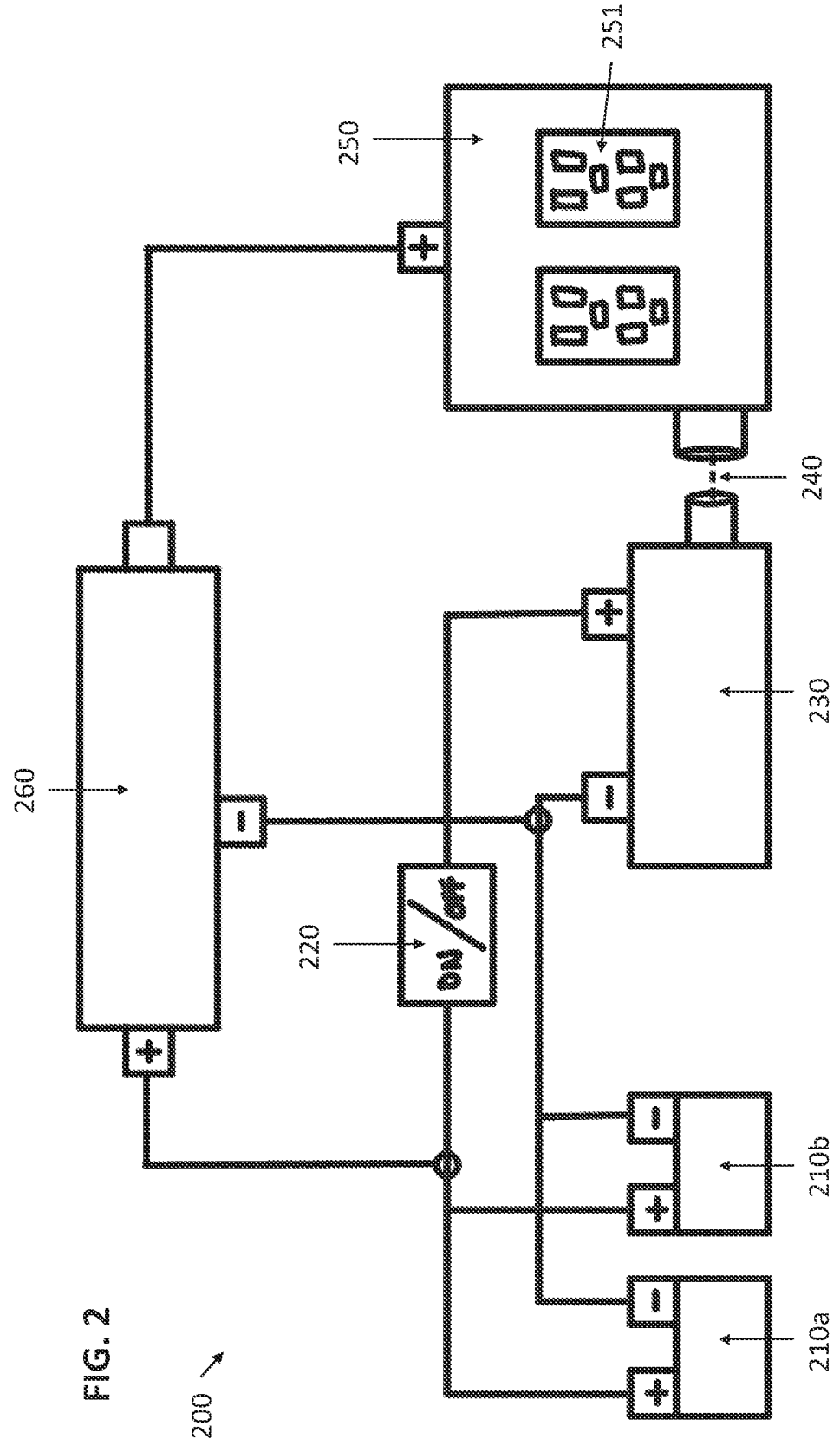
FIG. 2 depicts a block diagram of a power transducer in accordance with at least one embodiment of the present invention.

Alternative embodiments of the power transducer system 100 described heretofore are contemplated herein. For instance, FIG. 2 depicts one such alternative embodiment. There, the power transducer system 200 comprises at least two power cells 210a, 210b. In such an embodiment, such power cells 210a, 210b may comprise 12 volt batteries; however, alternative voltages are contemplated herein. Akin to the embodiment depicted in FIG. 1, the power transducer system 200 may route an electrical current to a switch component 220, which May comprise, for instance, a switch actuator, such as an on-off switch. Interconnected in electrical communication therewith may be a motor component 230, which may be configured to receive the 12 volt electrical potential from the power cell 210. Upon receipt of such 12 volt electrical potential, such motor component 230 may be configured to turn a movement apparatus at 3,600 revolutions per minute, thereby generating mechanical energy.

As with FIG. 1, the motor component 230 of the power transducer system 200 depicted in FIG. 2 may be interconnected with a generator component 250 through a rotational assembly 240, which may once again comprise a male rotational component configured in mechanical relation with a female rotational component. As such, the mechanical energy generated by such motor component 230 may thus be imparted on the generator component 250 for the generation of electrical power, such as through an armature component. Such a generator component 250 may comprise a downstream load output 251, for the interconnection with at least one downstream load, such an electrical device and/or apparatus.

Once again, such generator component 250 may generate certain residual energy not transferred to the downstream load. In such an instance, such residual energy may be transferred to a converter component 260. Such a converter component 260 may be configured to convert the electrical power generated by the generator component 250 from an alternating current to a direct current. For instance, in the embodiment depicted in FIG. 2, such a converter component 260 may comprise a 110 volt AC to a 12 volt DC converter.

Such converter component 260 may be interconnected with the power cell 210, such that the residual energy is transferred back to the power cell 210. As such, it may be understood the power cell 210 may be recharged, and the cycle of the power transducer system 200 may thus be reinitiated with only minimal losses.

Figure 3:
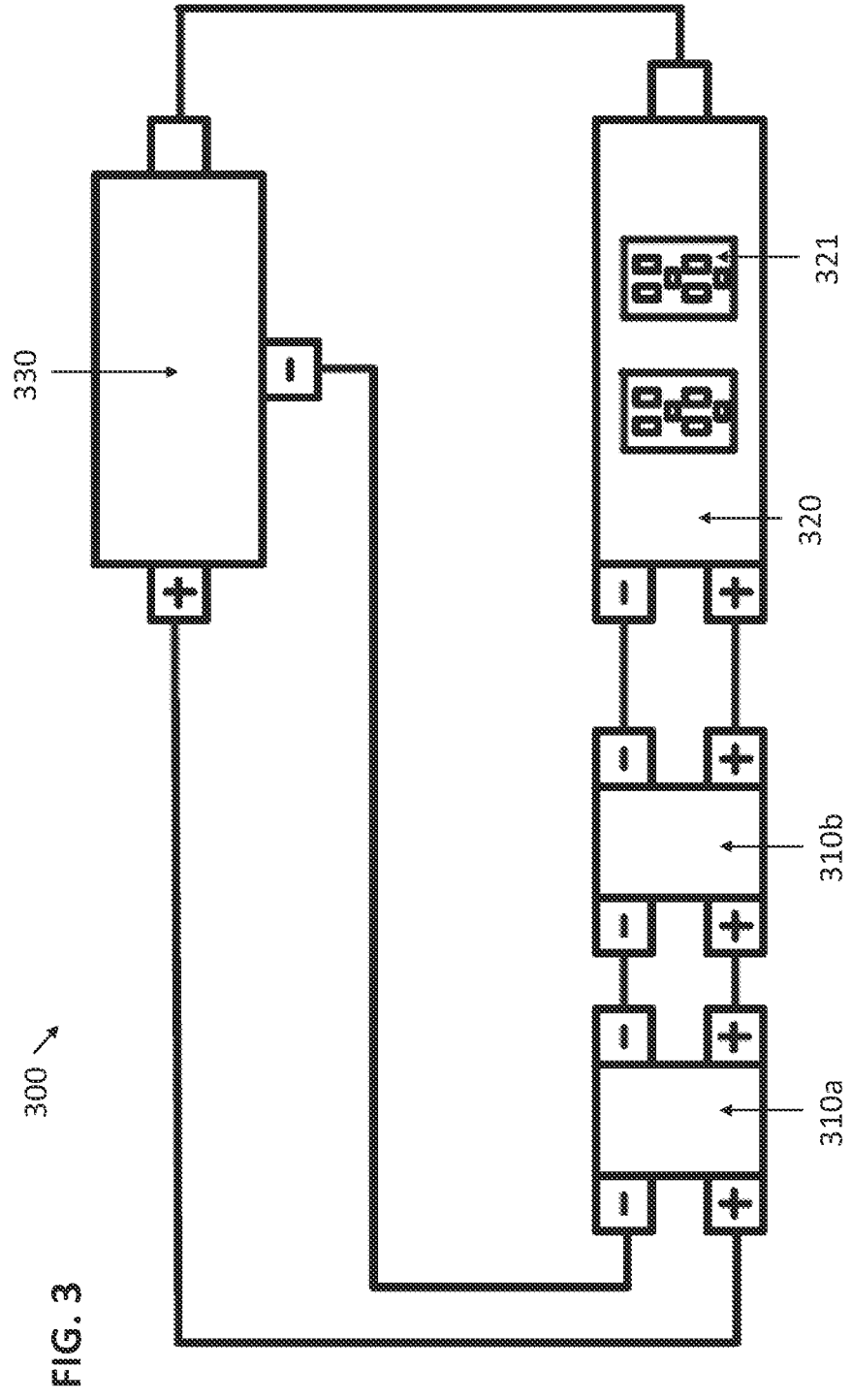
FIG. 3 depicts a block diagram of a power transducer in accordance with at least one embodiment of the present invention.

Likewise, FIG. 3 depicts yet an additional embodiment of the present invention. Specifically, FIG. 3 depicts a power transducer system 300 configured in the absence of moving parts. For instance, in the embodiment depicted in FIG. 3, such a power transducer system 300 may comprise a power cell 310, which may comprise two batteries 310a and 310b; however, only a single battery is likewise contemplated herein. In the embodiment depicted in FIG. 3, such power cell comprises 12 volt batteries, but again, other types of batteries are contemplated herein.

Such power cell 310 may be interconnected with an inverter component 320. Such an inverter component 320 may comprise, for instance, a 12 volt DC to 110 volt AC inverter. Such an inverter component 320 may further comprise at least one downstream load output 321 for interconnection with at least one downstream load.

Electrically interconnected with such inverter component 320 may be a converter component 330, such as the one depicted in FIG. 2. Here, in FIG. 3, such a converter component 330 may comprise a 110 volt AC to 12 volt DC converter. As such, the converter component may thus receive residual energy from such invertor component 320, convert the voltage of the same into a direct current, and then subsequently resupply such residual energy to the power cell 310 to recharge the same, and reinitiate the cycle.

In view of the foregoing, the various embodiments of the present invention serve to provide power to downstream loads while operating at a high efficiency, thereby reducing the reliance of such a power transducer system 100, 200, 300 on the power cells 110, 210, 310 themselves. Thus, the various embodiments of the present invention may be configured to recycle residual energy through a scalable system, thereby increasing efficiency and reducing losses to the open system.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A power transducer system comprising:

at least one power cell having an amount of initial energy stored therein;

said at least one power cell electrically interconnected with at least one inverter component configured to change a current provided by said at least one power cell to an alternating current;

said at least one inverter component electrically interconnected with a switch component, said switch component comprising at least one switch actuator;

said switch component electrically interconnected with at least one motor component, said at least one motor component configured to generate mechanical energy;

said at least one motor component disposed in mechanical connection with at least one generator component through a rotational assembly, said at least one generator component comprising an armature component configured to generate electrical energy;

said at least one generator component further comprising at least one downstream load output configured to provide electrical energy to at least one downstream load interconnected thereto; and said at least one generator component electrically interconnected with said switch component for the provision of residual energy thereto.

2. The power transducer system of claim 1, wherein said rotational assembly comprises a male rotational component and a female rotational component.

3. The power transducer system of claim 1, wherein said at least one power cell comprises one 12 volt battery.

4. The power transducer system of claim 1, wherein said at least one power cell comprises two 12 volt batteries.

5. The power transducer system of claim 1, wherein said at least one power cell comprises an electrochemical cell, a fuel cell, or a solar cell.

6. The power transducer system of claim 1, wherein said at least one inverter component comprises a 12 volt DC to 110 volt AC inverter.

7. The power transducer system of claim 1, wherein said at least one motor component comprises a 110 volt motor configured to operate at 3600 revolutions per minute.

8. A power transducer system comprising:

at least one power cell having an amount of initial energy stored therein;

said at least one power cell electrically interconnected with at least one motor component through a switch component, said switch component comprising at least one switch actuator;

said at least one motor component disposed in mechanical connection with at least one generator component, said at least one generator component comprising an armature component configured to generate electricity;

said at least one generator component comprising at least one downstream load output configured to provide electrical energy to at least one downstream load interconnected thereto; and said at least one generator component electrically interconnected with at least one converter component, said at least one converter component configured to receive an amount of residual energy from said at least one generator component, convert said residual energy into a direct current, and subsequently provide said residual energy to said power cell.

9. The power transducer system of claim 8, wherein said at least one power cell comprises a volt battery.

10. The power transducer system of claim 8, wherein said at least one motor component comprises a 12 volt motor configured to operate at 3600 revolutions per minute.

11. The power transducer system of claim 8, wherein said at least one converter component comprises a 110 volt AC to 12 volt DC converter.

12. The power transducer system of claim 8, wherein said at least one power cell comprises an electrochemical cell, a fuel cell, or a solar cell.

13. A power transducer system comprising:

at least one power cell having an amount of initial energy stored therein;

said at least one power cell electrically interconnected with at least one inverter component configured to change a current provided by said at least one power cell to an alternating current;

said at least one invertor component comprising at least one downstream load output configured to provide electrical energy to at least one downstream load interconnected thereto; and said at least one inverter component electrically interconnected with at least one converter component, said at least one converter component configured to receive an amount of residual energy from said at least one generator component, convert said residual energy into a direct current, and subsequently said residual energy to said power cell.

14. The power transducer system of claim 13, wherein said at least one power cell comprises a 12 volt battery.

15. The power transducer system of claim 13, wherein said at least one power cell comprises two 12 volt batteries.

16. The power transducer system of claim 13, wherein said at least one power cell comprises an electrochemical cell, a fuel cell, or a solar cell.

17. The power transducer system of claim 13, wherein said at least one inverter component comprises a 12 volt DC to 110 volt AC inverter.

18. The power transducer system of claim 13, wherein said at least one converter component comprises a 110 volt AC to 12 volt DC converter.

* * * * *